United States Patent
Pixton et al.

(10) Patent No.: US 9,986,162 B2
(45) Date of Patent: May 29, 2018

(54) COMPACT WIDE FIELD-OF-VIEW OPTICAL IMAGING METHOD CAPABLE OF ELECTRICALLY SWITCHING TO A NARROW FIELD OF VIEW

(71) Applicant: The United States of America, as represented by the Secretary of the Army, Washington, DC (US)

(72) Inventors: Bruce M. Pixton, Woodbridge, VA (US); Jay N. Vizgaitis, Alexandria, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days. days.

(21) Appl. No.: 15/787,744

(22) Filed: Oct. 19, 2017

(65) Prior Publication Data
US 2018/0041702 A1 Feb. 8, 2018

Related U.S. Application Data

(62) Division of application No. 14/972,138, filed on Dec. 17, 2015, now Pat. No. 9,826,153.

(51) Int. Cl.
*H04N 5/232* (2006.01)
*H04N 5/225* (2006.01)
(Continued)

(52) U.S. Cl.
CPC ..... *H04N 5/23245* (2013.01); *G02B 17/0657* (2013.01); *G02B 27/0006* (2013.01);
(Continued)

(58) Field of Classification Search
CPC . G02B 5/20; G02B 5/208; G02B 5/28; G02B 17/00; G02B 17/0657; G02B 23/00;
(Continued)

(56) References Cited

U.S. PATENT DOCUMENTS 4,453,800 A * 6/1984 Fjeldsted ............... G02B 13/14
359/351
4,877,317 A 10/1989 Gibbons et al.
(Continued)

OTHER PUBLICATIONS

Tremblay, E., Stack, R., Morrison, R., and Ford, J., "Ultrathin cameras using annular folded optics." Applied Optics, vol. 46, No. 4, pp. 463-471 (2007).
(Continued)

*Primary Examiner* — Thong Nguyen
(74) *Attorney, Agent, or Firm* — Richard J. Kim (57) ABSTRACT

An optical system that images a scene at two different fields of view, with switching between fields of view enabled by switchable mirrored surface is disclosed. A voltage change across the switchable mirror element generates a change in the reflection and transmission properties of the element, such that the element switches between a mirror state and a lens state. When nested in an annular reflective optic system of a given field of view, the switching element enables the opening of an additional optical path through the center of the reflective optics where a set of refractive optics are assembled into an imaging system for a second field of view. This dual field-of-view system changes field of view with no mechanical movement.

5 Claims, 6 Drawing Sheets

(51) Int. Cl.
  *G02F 1/133* (2006.01)
  *G02F 1/163* (2006.01)
  *G02B 27/00* (2006.01)
  *G02B 17/06* (2006.01)

(52) U.S. Cl.
  CPC ..... *G02B 27/0081* (2013.01); *G02F 1/13306* (2013.01); *G02F 1/163* (2013.01); *H04N 5/2254* (2013.01); *H04N 5/23238* (2013.01)

(58) Field of Classification Search
  CPC .... G02B 23/14; G02B 27/00; G02B 27/0075; G02B 27/0081; G02B 27/0189; G02B 27/095; G02B 27/0955; G02B 27/0977; G02B 27/0983; G02B 27/12; G02B 27/123; G03F 1/13306; G03F 1/163; H04N 5/2254; H04N 5/23238; H04N 5/23245
  See application file for complete search history.

(56) References Cited

U.S. PATENT DOCUMENTS

| | | | |
|---|---|---|---|
| 5,113,281 | A | 5/1992 | Mandelboum et al. |
| 5,161,051 | A | 11/1992 | Whitney et al. |
| 5,329,347 | A | 7/1994 | Wallace et al. |
| 6,118,583 | A | 9/2000 | Rogers |
| 6,999,649 | B1 | 2/2006 | Chen et al. |
| 7,180,659 | B2 | 2/2007 | Doittau et al. |
| 8,593,729 | B2 | 11/2013 | Vizgaitis |
| 8,830,571 | B1 | 9/2014 | Vizgaitis |
| 9,826,153 | B2 * | 11/2017 | Pixton ................ G02B 17/0652 |

OTHER PUBLICATIONS

Tajima, K., Hotta, H., Yamada, Y., Okada, M., and Yoshimura, K., "Electrochromic switchable mirror glass with controllable reflectance." Applied Physics Letters, vol. 100, No. 9, pp. 091906-1-091906-3 (2012).

* cited by examiner

Figure 1

| Element Number | ROC (Front) | ROC (Back) | Thickness | Material | Aperture Diameter (Outer) | Aperture Diameter (Inner) |
|---|---|---|---|---|---|---|
| Object | Infinity | | Infinity | | | |
| 6 | Infinity | Infinity | 3.7 | ZnS | 100.5 | 65 |
| | | | 1.0 | | | |
| 7 | Infinity | Infinity | 33.4 | Aperture Stop | 100 | 70 |
| 1 | -93.58 | | 0.0 | Mirror | 104.5 | 66 |
| | | | -22.4 | k=-1.704; A1=7.97e-8; A2=1.16e-11; A3=6.44e-16; A4=2.54e-19 | | |
| 2 | -45.55 | | 0.0 | Mirror | 68 | 40 |
| | | | 22.3 | k=-2.54; A1=9.05e-7; A2=3.15e-10; A3=2.34e-13; A4=5.68e-17 | | |
| 3 | -70.36 | | 0.0 | Mirror | 66 | 30 |
| | | | -16.5 | k=0; A1=6.61e-7; A2=1.35e-10; A3=-2.10e-14; A4=1.77e-17 | | |
| 5 | -120.39 | -135.11 | -1.0 | N-BK7 | 40 | 0 |
| 4 | -135.11 | | 0.0 | Switchable Mirror Layer | 40 | 0 |
| 5 | -135.11 | -120.39 | 1.0 | N-BK7 | 40 | 0 |
| | | | 16.0 | | | |
| 8 | Infinity | Infinity | 2.9 | ZnS | 40 | 0 |
| | | | 10.0 | | | |
| 9 | Infinity | Infinity | 1.5 | N-BK7 | 25.4 | 0 |
| | | | 1.9 | | | |
| Image | Infinity | | | | | |

| Element Number | ROC (Front) | ROC (Back) | Thickness | Material | Aperture Diameter (Front) | Aperture Diameter (Back) |
|---|---|---|---|---|---|---|
| Object | Infinity | | Infinity | | | |
| 11 | Infinity | | 0.0 | Aperture Stop | 23.6 | |
| | | | 4.0 | | | |
| 12 | -19.66 | -25.44 | 9.1 | ZnSe | 25.6 | 33.3 |
| | | | 2.0 | | | |
| 13 | 56.08 | 20.34 | 9.6 | Schott IGX-A | 36.5 | 33 |
| 14 | 20.34 | -412.35 | 9.7 | ClearTran | 33 | 32.7 |
| | | | 4.4 | | | |
| 15 | -30.71 | -37.29 | 10.0 | ClearTran | 32.5 | 36.9 |
| | | | 0.6 | (rear) k=-0.132; A1=1.42e-7; A2=-2.15e-9; A3=2.80e-12; A4=-4.20e-15 | | |
| 16 | Infinity | -135.11 | 6.0 | ClearTran | 40 | 40 |
| 4 | | | 0.0 | Switchable Mirror Layer (Transparent State) | | |
| 5 | -135.11 | -120.39 | 1.0 | N-BK7 | 40 | 40 |
| | | | 16.0 | | | |
| 8 | Infinity | Infinity | 2.9 | ZnS | 30 | 30 |
| | | | 10.0 | | | |
| 9 | Infinity | Infinity | 1.5 | N-BK7 | 25.4 | 25.4 |
| | | | 1.9 | | | |
| Image | Infinity | | | | | |

COMPACT WIDE FIELD-OF-VIEW OPTICAL IMAGING METHOD CAPABLE OF ELECTRICALLY SWITCHING TO A NARROW FIELD OF VIEW

REFERENCE TO RELATED APPLICATIONS

This is a divisional patent application of copending application Ser. No. 14/972,138 filed Dec. 17, 2015, entitled "Dual Field of View Annular Folded Optics with Switchable Mirrored Surface." The aforementioned application is hereby incorporated herein by reference.

GOVERNMENT INTEREST

The invention described herein may be manufactured, used, sold, imported, and/or licensed by or for the Government of the United States of America.

FIELD OF THE INVENTION

This invention relates in general to optics, and more particularly, to dual field of view optics.

BACKGROUND OF THE INVENTION

Smaller size and weight factor greatly into user selection for many handheld, head-mounted, or airborne imaging systems, even when the added weight or size can provide otherwise useful capabilities. The conventional means for field of view (FOV) switching generally requires more elements and additional mechanisms, which usually equates to longer mechanical size over equivalent fixed FOV systems. Annular folded reflective optics have been described in literature, for example by Tremblay, et al. (2006), as a means to reduce overall imaging system length. (See, e.g., Tremblay, E., Stack, R., Morrison, R., and Ford, J., "Ultra-thin cameras using annular folded optics." Applied Optics, Vol. 46, No. 4, pp. 463-471 (2007).) Switching FOV in an annular folded system has previously required the insertion of an afocal, which involves mechanical motion of some form or another as is the case in U.S. Pat. No. 8,593,729 to Vizgaitis (2013) and U.S. Pat. No. 8,830,571 to Vizgaitis (2014). As reconfigurable optic technologies are becoming more mature, switchable optic elements integrated with static optics can provide FOV switching capability in a smaller size and weight than a conventional zoom system. The switchable reflectivity of an optical element is a capability that has been enabled by technologies such as liquid crystals, as in U.S. Pat. No. 6,999,649 to Chen and Li (2006), and electrochromic materials discussed in Tajima, et al. (2012). (See, Tajima, K., Hotta, H., Yamada, Y., Okada, M., and Yoshimura, K., "Electrochromic switchable mirror glass with controllable reflectance." Applied Physics Letters, Vol. 100, No. 9, pp. 091906-1-091906-3 (2012).)

SUMMARY OF THE INVENTION

The present invention leverages switchable mirror technologies to make an otherwise static FOV annular folded optic into a switchable FOV imaging system, with no mechanical motion. Specifically, the disclosure combines three static annular mirrored surfaces, five refracting lenses, and a switchable reflecting surface to make a switchable FOV imaging system. The three static reflecting surfaces, in conjunction with the switchable reflecting surface form a narrow fixed FOV. The five refracting lenses compose a wide fixed FOV and are aligned along the central axis of the annular reflecting surfaces, the final surface of the last lens element having the same curvature as is needed for the narrow FOV configuration to form an image properly. The switchable reflecting surface is the final powered surface in either FOV and is composed of a material that can switch between a highly reflective ("mirror") state and a highly transmissive ("clear") state. The state of the switchable element controls what FOV is seen at the image plane, where a suitable detector can be placed.

The lens elements in this invention are designed from materials that are highly transmissive and effective at refracting light from the broad-band Short Wave InfraRed (SWIR) portion of the electromagnetic spectrum (e.g., of 1.0-1.7 µm). Similarly, the reflective surfaces, both static and switchable are designed with suitable coatings for SWIR. Although the solution described herein was designed for SWIR illumination, by a change of materials and re-optimization of the lens parameters, the solution is easily adapted to other illumination bands.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
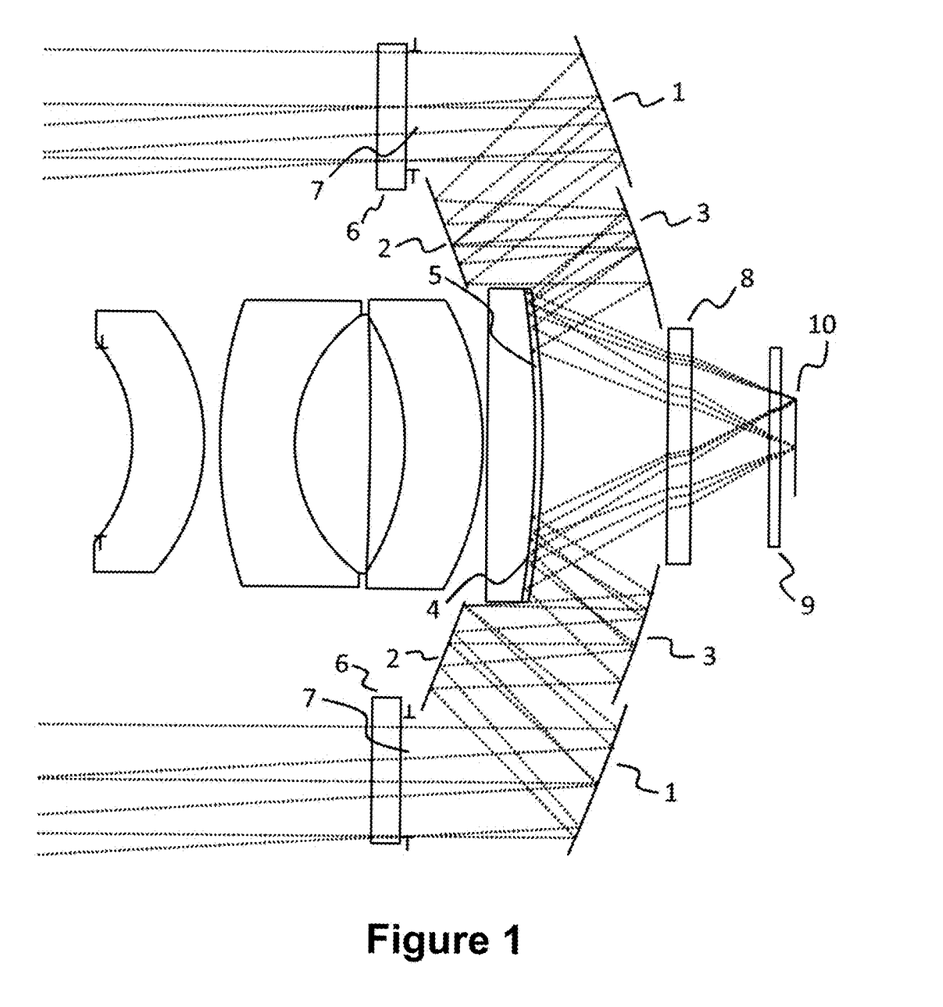
FIG. 1 shows an exemplary optical raytrace of the imager in the narrow FOV mode whereas the switchable surface is in the reflective "mirror" state and the optical path to the detector is routed through the annular folded optics.

In one aspect, FIG. 1 shows an exemplary optical raytrace of the imager in the narrow FOV mode whereas the switchable reflective surface is in the "mirror" state and the optical path to the detector is routed through the annular folded optics. Light from a distant object enters the narrow FOV layout through an annular window 6, which is ultimately constricted by the aperture stop 7 behind it. As tabulated in FIG. 2, the window 6 can be fabricated from ZnS material and both an outer and an inner aperture diameter define the limits of the annular window. In this example, window 6 can have outer and inner diameters of 100.5 mm and 65 mm, respectively, and the aperture stop 7 can have outer and inner diameters of 100 mm and 70 mm, respectively. The static reflecting surfaces 1, 2, and 3 are arranged in an annular configuration concentric with the stop annulus, with the largest diameter reflecting surface 1 facing the distant object to be imaged. Reflecting surface 1 has an outer diameter aperture that can be 104.5 mm and an inner diameter that can be 66 mm. Light passing the stop 7 reflects from surface 1 and proceeds toward surface 2, which is facing surface 1 and has outer and inner aperture diameters that can be 68 mm and 40 mm, respectively. Light reflected from surface 2 subsequently reflects toward surface 3, with outer and inner aperture diameters that can be 66 mm and 30 mm, respectively. With each reflection, the light changes direction and gradually approaches the central axis of the annulus, so that the aperture of each subsequent surface has a smaller outer diameter.

Figure 2:
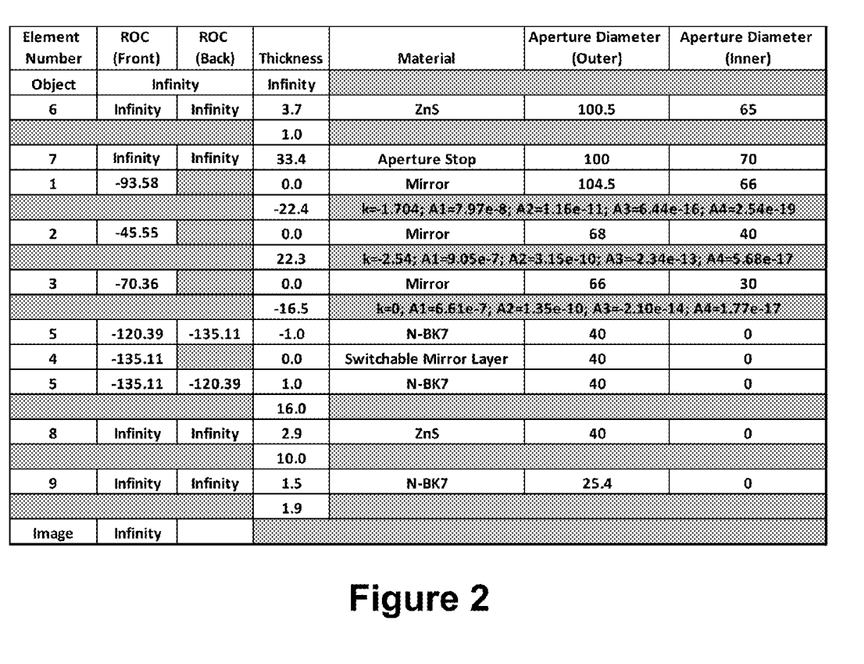
FIG. 2 is a table of the raytrace parameters for the imager with the narrow FOV path shown in FIG. 1.

Surfaces 1, 2, and 3 additionally have a radius of curvature (ROC) and aspheric attributes that help the light rays to properly form an image. The ROC values for surfaces 1, 2, and 3 can be respectively, −93.58 mm, −45.55 mm, and, −70.36 mm. The aspheric terms modify the curvature of the surface according to the equation for sag (linear departure from the vertex plane) z:

$$z = \frac{r^2}{R + \sqrt{R^2 - (1+k)r^2}} + A_1 r^4 + A_2 r^6 + A_3 r^8 + A_4 r^{10},$$

where r is the radial distance from the vertex, R is the radius of curvature, k is the conic constant, and $A_n$ indicates aspheric coefficients. The aspheric terms for surfaces 1, 2, and 3 are tabulated in FIG. 2.

The light reflected from surface 3 reaches surface 4 where, when in the "mirror" state, surface 4 gives the light a final reflection toward the image plane 10. The aperture diameter for surface 4 can be 40 mm, and its ROC can be −135.11 mm. In some cases, a cover plate 5 is required for electrode attachment and mechanical stability of the switchable layer 4. This cover plate can be made from N-BK7 material to be transparent in the band of interest and can, as is the case here, have a different front curvature (−120.39 mm) than that of layer 4. The back curvature of 5 is in contact with 4 and should therefore have the same curvature as the switchable layer. The cover glass 9 is included as a protection to the sensor array placed at the image plane 10 and can also be made from N-BK7. Windows 6 and 8 help to seal the mirrored surfaces of the annular folded optics against environmental damage, since the surfaces are otherwise open, with no intervening solid between them. These windows can be made from ZnS.

Figure 3:
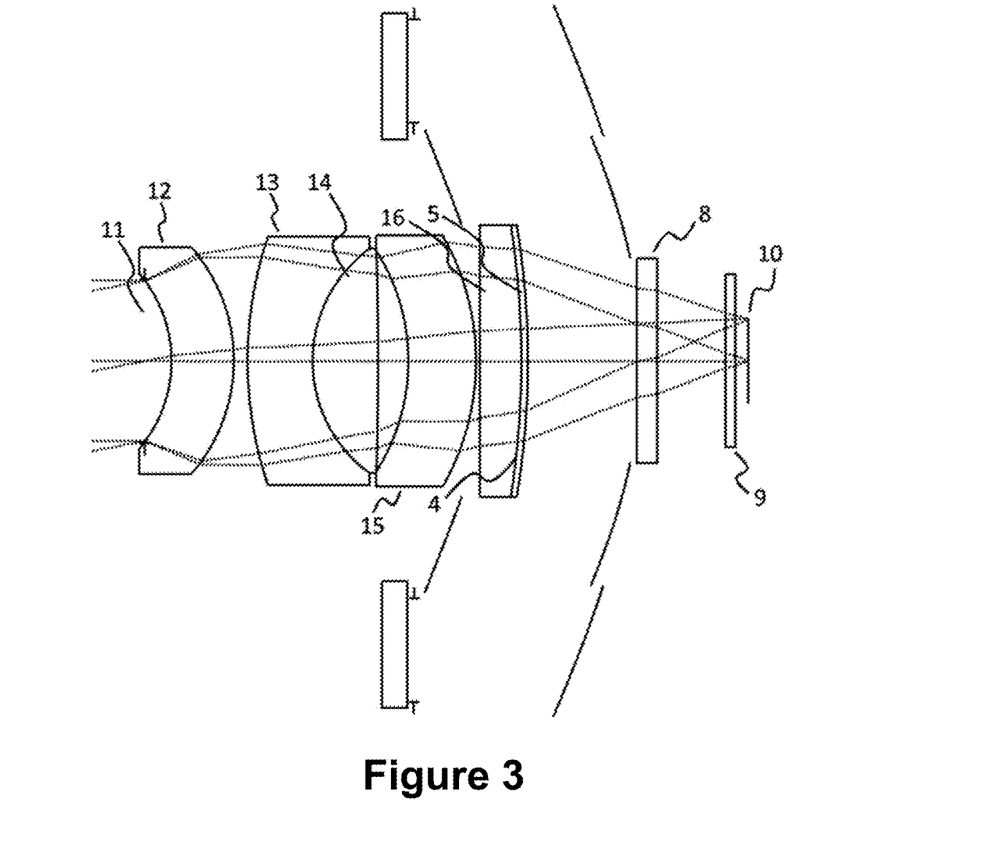
FIG. 3 shows an exemplary optical raytrace of the imager in the wide FOV mode whereas the switchable surface is in the transmissive "clear" state and the optical path to the detector is routed through the lenses nested in the hole of the annular folded optics.
Figure 4:
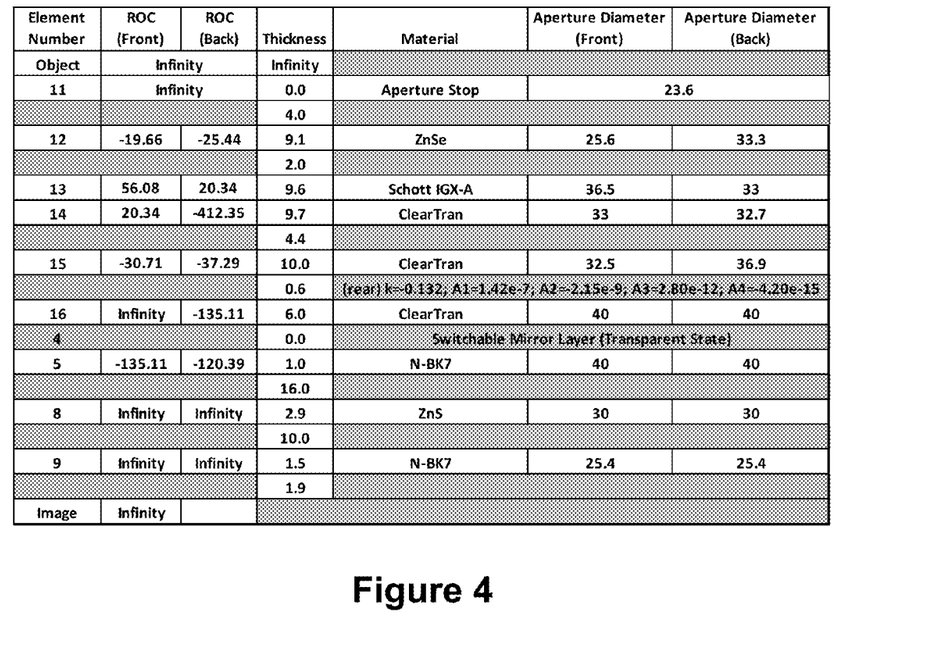
FIG. 4 is a table of the raytrace parameters for the imager with the wide FOV path shown in FIG. 3.

Upon switching surface 4 to the "clear" state, an alternate path for the light to travel is opened, as is illustrated in FIG. 3. FIG. 4 is a table of the raytrace parameters for the imager with the wide FOV path shown in FIG. 3. Light from a distant object enters this path through the aperture stop 11, which can have a diameter of 23.6 mm. The light is first refracted by lens 12, which can be a meniscus lens made from ZnSe material, with front ROC of −19.65 mm and aperture diameter of 25.6 mm and back ROC of −25.44 mm and aperture diameter of 33.3 mm. The light refracted from 12 then enters a doublet element composed of lenses 13 and 14. Lens 13 can be made from Schott IGX-A material, with front ROC of 56.08 mm and aperture diameter of 36.5 mm and back ROC of 20.34 mm and aperture diameter of 33 mm. The front surface of lens 14 matches the back surface of 13 in both ROC and aperture, and a suitable adhesive layer that is transparent for SWIR is used to glue the lenses together. Lens 14 can be made from ClearTran material, with back ROC of −412.35 mm and aperture diameter of 32.7 mm. Light refracted through this doublet enters the aperture of lens 15, which can be made from ClearTran material. The front ROC of 15 can be −30.71 mm and aperture diameter of 32.5 mm and back ROC of −37.29 mm and aperture diameter of 36.9 mm. Lens 15 additionally has an aspheric departure from the sphere on the back surface, as indicated by the parameters in FIG. 4. Light refracted by lens 15 enters the aperture of lens 16, which can be made from ClearTran material, with a flat front surface, having infinite ROC and a curved back surface with an ROC of −135.11 mm. Both front and back apertures of lens 16 can be 40 mm. The back surface of lens 16 is the substrate onto which the switchable layer 4 is mounted. When layer 4 is switched to the "clear" state, the light will pass through 4 and proceed to the image plane 10, passing through elements 5, 8, and 9, in a similar manner as described above for the narrow FOV.

The effective f/number is an important factor that determines how much light will reach the image plane 10. Annular optics, as are used in the narrow FOV described above, have a central obscuration along the annular axis that reduces the amount of light that would otherwise reach the image plane if the full aperture were used. The effective f/number is calculated by the following formula:

$$f/\text{number}_{\text{eff}} = f/\text{number}\left[1 - \left(\frac{D_{obs}}{D}\right)^2\right]^{-1/2},$$

where $D_{obs}$ is the diameter of the obscuration, namely the inner diameter of the aperture stop 7, and D is the entrance pupil diameter, namely the outer diameter of 7. When there is no obscuration, $D_{obs}$ equals 0, and the effective f/number is equal to the full aperture f/number. The subject invention is designed to keep the effective f/number of the narrow FOV equal to that of the wide FOV, which has a value of 1.4. The two fields of view vary in focal length by a factor of three.

Figure 5:
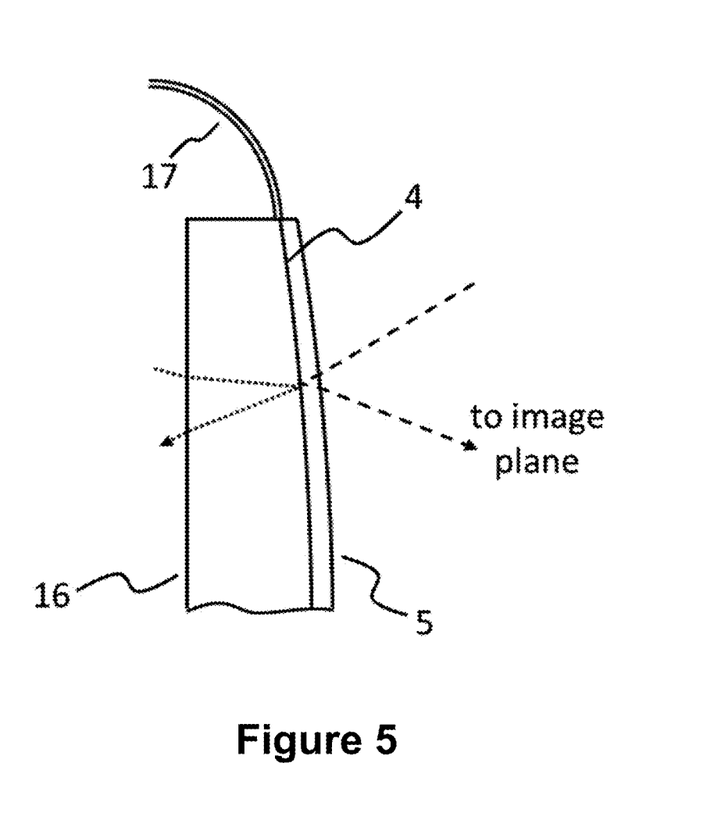
FIG. 5 is a close-up view of the switchable surface in the "mirror" state, where the dashed line represents a light ray that follows the narrow FOV path through the annular reflective optics and reflects off the switchable surface to arrive at the image plane.
Figure 6:
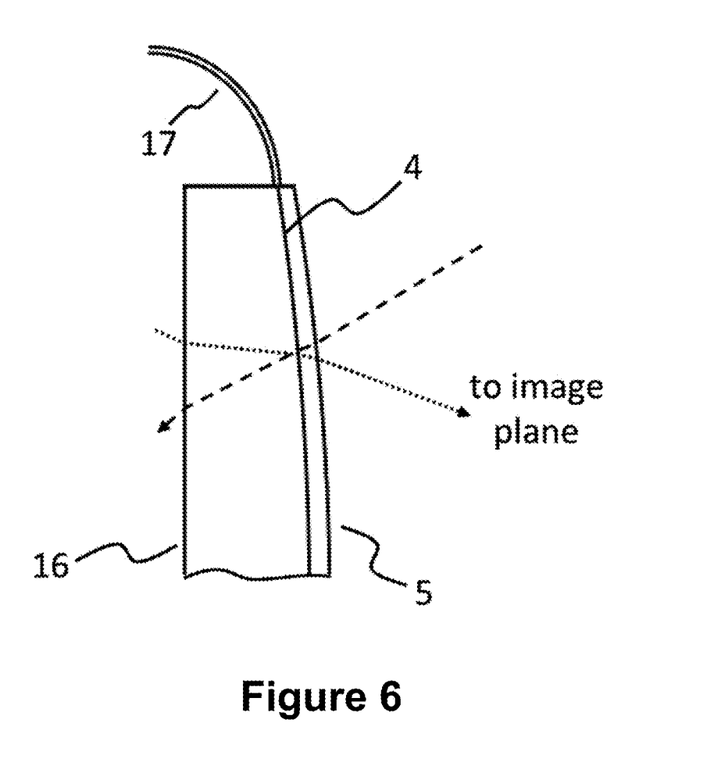
FIG. 6 is a close-up view of the switchable surface in the "clear" state, where the dotted line represents a light ray that follows the wide FOV path through the refractive optics and transmits through the switchable surface to arrive at the image plane.

The FOV that is seen at the image plane 10 is controlled by the state of the switchable layer 4. This layer can be created from a switchable material (for example, liquid crystals or electrochromic materials) that is designed to switch between "mirror" and "clear" states, as controlled by an electrical voltage signal. FIGS. 5 and 6 show a close-up view of the switchable layer 4, applied to lens 16 and protected by cover glass 5. Electrical connections for applying voltage to layer 4 are provided by wires 17. FIG. 5 demonstrates the "mirror" state, where the dashed line represents a light ray that follows the narrow FOV path through the annular reflective optics. At surface 4, the "mirror" state reflects the light towards the image plane 10. The dotted line represents a light ray that comes through the wide FOV refractive path, but is reflected at 4, thus preventing it from arriving at the image plane 10. FIG. 6 demonstrates the "clear" state, where the dashed line, representing a light ray coming through the annular reflective optics, transmits through surface 4 and does not progress toward the image plane 10. With surface 4 in the "clear" state, the dotted line, representing a light ray coming through the wide FOV refractive path, transmits through 4 and is directed toward the image plane.

It is obvious that many modifications and variations of the present invention are possible in light of the above teachings. It is therefore to be understood that within the scope of the appended claims, the invention may be practiced otherwise than as described.

What is claimed is:

1. A compact wide field-of-view optical imaging method capable of electrically switching to a narrow field of view, comprising:
    imaging a distant object through a wide field-of-view aperture stop;
    first refracting said image through a meniscus lens;
    refracting said image from said meniscus lens through a doublet lens element;
    refracting said image from said doublet lens element through the aperture of a lens having an aspheric departure on its back surface;
    refracting said image from said lens having an aspheric departure on its back surface through the aperture of a lens having a flat front surface and a curved back surface, wherein a switchable reflective surface is disposed onto the back surface of said lens having a flat front surface and a curved back surface; and
    focusing said image from said aperture of a lens through said switchable reflective surface towards an image plane of a sensor array when said switchable reflective surface is switched to a clear state.

2. The compact wide field-of-view optical imaging method capable of electrically switching to a narrow field of view according to claim 1, wherein when said switchable reflective surface is switched to a mirror state, an alternate narrow field-of view image is reflected from alternate annular folded optics by said switchable reflective surface in said mirror state towards said image plane of said sensor array.

3. The compact wide field-of-view optical imaging method capable of electrically switching to a narrow field of view according to claim 1, further comprising the step of disposing a cover plate for electrode attachment and mechanical stability of the switchable reflective surface.

4. The compact wide field-of-view optical imaging method capable of electrically switching to a narrow field of view according to claim 1, wherein said switchable reflective surface is based on either liquid crystals or electrochromic switchable materials capable of switching between mirror and clear states based on switching an electrical control voltage signal.

5. The compact wide field-of-view optical imaging method capable of electrically switching to a narrow field of view according to claim 1, further comprising the step of disposing a cover glass for the sensor array.

* * * * *